United States Patent
Kurtz (10) Patent No.: US 6,272,928 B1
(45) Date of Patent: Aug. 14, 2001

(54) HERMETICALLY SEALED ABSOLUTE AND DIFFERENTIAL PRESSURE TRANSDUCER

(75) Inventor: Anthony D. Kurtz, Ridgewood, NJ (US)

(73) Assignee: Kulite Semiconductor Products, Leonia, NJ (US)

( * ) Notice: Subject to any disclaimer, the term of this patent is extended or adjusted under 35 U.S.C. 154(b) by 0 days.

(21) Appl. No.: 09/490,083

(22) Filed: Jan. 24, 2000

(51) Int. Cl.⁷ .................................................. G01L 9/06
(52) U.S. Cl. .................................................. 73/721
(58) Field of Search .............................. 73/715, 716, 717, 73/719, 720, 721, 723, 725, 726, 727, 754; 361/283.4; 29/25.41, 25.42

(56) References Cited

U.S. PATENT DOCUMENTS

| | | | |
|---|---|---|---|
| 4,945,769 | * | 8/1990 | Sidner et al. ............................ 73/727 |
| 4,993,143 | * | 2/1991 | Sidner et al. ........................ 29/621.1 |
| 5,490,034 | * | 2/1996 | Zavracky et al. ................. 361/283.4 |
| 5,493,470 | * | 2/1996 | Zavracky et al. ................. 361/283.4 |

* cited by examiner

Primary Examiner—William Oen
(74) Attorney, Agent, or Firm—Arthur L. Plevy; Duane Morris & Heckscher (57) ABSTRACT

A single chip dielectrically isolated leadless pressure sensor adapted to substantially simultaneously measure a first pressure and a differential between the first pressure and a second pressure including: a wafer including first and second recessed portions respectively defining first and second deflectable diaphragms and at least one rim portion formed between the first and second recessed portions for isolating the first deflectable diaphragm from the second deflectable diaphragm; a first circuit mounted on the first deflectable diaphragm and being responsive to the first pressure; and a second circuit mounted on the second deflectable diaphragm and being responsive to the second pressure; wherein, the first and second circuits are adapted to be electrically coupled to one another so as to cooperatively provide a common output indicative of a differential pressure associated with the first and second pressures, while simultaneously partially providing an output indicative of the first or second pressures.

20 Claims, 8 Drawing Sheets

OUTPUT PROPORTIONAL TO $P_1 - P_2$

HERMETICALLY SEALED ABSOLUTE AND DIFFERENTIAL PRESSURE TRANSDUCER

FIELD OF INVENTION

The present invention relates to pressure sensing devices, and more particularly to pressure transducers adapted for use in hostile environments and capable of simultaneously measuring both an absolute and a differential pressure.

BACKGROUND OF INVENTION

Piezoresistive sensors have achieved widespread use as pressure or force measuring devices. In general, the prior art is replete with a number of patents which describe configurations and methods of fabricating a piezoresistive device. Presently, there is an increasing demand for the use of pressure transducers in various hostile environments such as high temperature, high vibration and acceleration and conductive media. As such, these devices need to be reliable but relatively economical. In any event, a dielectrically isolated semiconductor sensor piezo resistor is an attractive configuration in regard to many such uses.

In particular, there are many instances where it is necessary simultaneously to measure both an absolute and a differential pressure. Such an instance is an aircraft air speed indicator often called a pilot-static transducer. In this case, air speed is determined by measuring the "total" pressure, which is the pressure imposed on a "pilot tube", which is the pressure against the nose of the aircraft as it moves through the air, and the "static" pressure which is the atmospheric pressure surrounding the aircraft. The air speed is proportional to the difference between the "total," and "static" pressures.

In another instance, power surges in a jet engine can be detected by measuring the compressor intake pressure and the discharge pressure. The intake pressure and the pressure difference between the intake pressure and discharge pressure indicates the presence or absence of engine surge.

Another such application is the measurement of the pressure drop across a filter to determine whether the filter is allowing adequate flow. In this case, the pressure in front of the filter and the differential pressure across the filter indicate whether the filter is clean or clogged.

In all of the aforementioned instances, the transducer can be exposed to a hostile environment having a high temperature and/or high shock or vibration, and often a hostile pressure media.

There exist methods and devices which enable such measurements to be made, for instance, commonly assigned, copending U.S. patent application Ser. No. 09/338,145, filed on Jun. 23, 1999 and entitled "*COMBINED DIFFERENTIAL/ABSOLUTE PRESSURE TRANSDUCER AND METHOD FOR MAKING THE SAME*", the entire disclosure of which is incorporated by reference as if being set forth herein in its entirety. Conventional transducers are typically big, bulky and expensive, often requiring additional complex electronics (using capacitative transducers requires extensive electronics for signal conditioning and amplification) and in general are not suitable for use in hostile environments.

For instance, prior art semiconductor piezoresistive transducers typically require two sensor chips each having a separate metal isolation diaphragm and an oil filtered cavity to isolate it from the pressure media. In addition, prior art semiconductor, piezoresistive devices typically contain ultra-thin gold wires ball-bonded between a sensor chip and an external contact. Such gold wires may break when the transducer is exposed to high shock and vibration. Moreover, most prior art semiconductor sensors employ p-n junctions to insure isolation of the piezoresistive network from the bulk semiconductor, which is not suitable for use in high temperatures.

It is therefore an object of the present invention to produce a relatively small and economical dielectrically isolated single chip leadless sensor which is capable of simultaneously measuring absolute and differential pressure.

SUMMARY OF INVENTION

A single chip dielectrically isolated silicon sensor adapted to substantially simultaneously measure a first absolute pressure and a second absolute pressure and the difference in pressure between the first and second pressure. The sensor includes: a wafer containing first and second recessed portions respectively defining first and second deflectable diaphragms and at least one rim portion formed between the first and second recessed portions for isolating the first deflectable diaphragm from the second deflectable diaphragm; a first circuit mounted on the first deflectable diaphragm and being responsive to the first pressure; and, a second circuit mounted on the second deflectable diaphragm and being responsive to the second pressure; wherein, the first and second circuits are adapted to be dielectrically coupled to one another so as to cooperatively provide a common output indicative of a difference between the first and second pressures, as well as being able to separately measure each absolute pressure.

DETAILED DESCRIPTION OF THE INVENTION

There is herein disclosed a hermetically sealed dielectrically isolated semiconductor sensor fabricated from a single piece of silicon capable of simultaneously measuring absolute and differential pressures. Referring now to the Figures, like references identify like elements of the invention.

Figure 1:
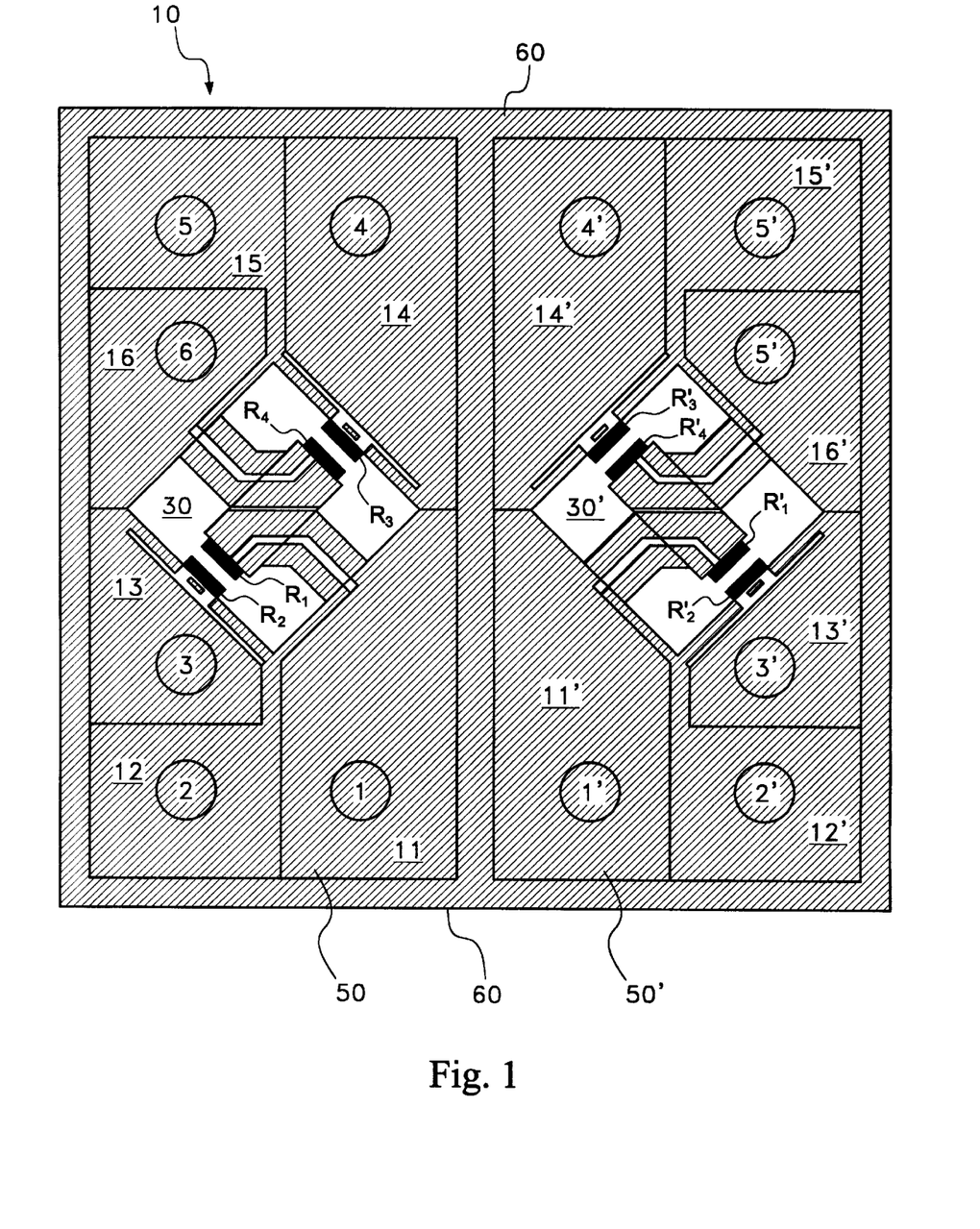
FIG. 1 illustrates a plan-view of a sensor structure die layout according to a preferred form of the present invention.

FIG. 1 illustrates a plan view of a sensor structure die layout 10 formed on a single silicon wafer 5 according to a preferred form of the present invention. The structure 10 includes two independent, open, four active arm Wheatstone bridges 20, 20' each having six contact areas or fingers 11, 12, 13, 14, 15 and 16 and 11', 12' 13', 14', 15' and 16' respectively, and its own active area 30, 30' being defined by a deflectable diaphragm 40, 40' and an inactive area 50, 50' (see, FIG. 3 also). The four piezo resistors $R_1, R_2, R_3, R_4$ and $R_1', R_2', R_3', R_4'$ of each bridge 20, 20' as well as the six contact areas or fingers 11, 12, 13, 14, 15 and 16 and 11', 12', 13', 14', 15' and 16' are preferably fabricated from P+silicon affixed to a layer of $SO_2$ grown on a substrate and formed in accordance with the teaching of commonly assigned U.S. Pat. No. 5,286,671 entitled *"Diffusion Enhanced Fusion Bonding"*, the entire disclosure of which is also hereby incorporated by referenced as if being set forth in its entirely herein.

Figure 2A:
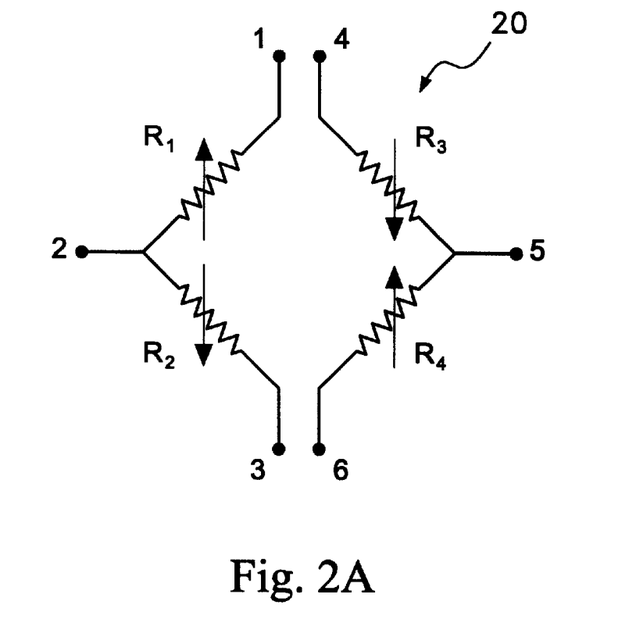
FIGS. 2A and 2B illustrate electrical equivalents of the Wheatstone bridge assemblies of FIG. 1.
Figure 2B:
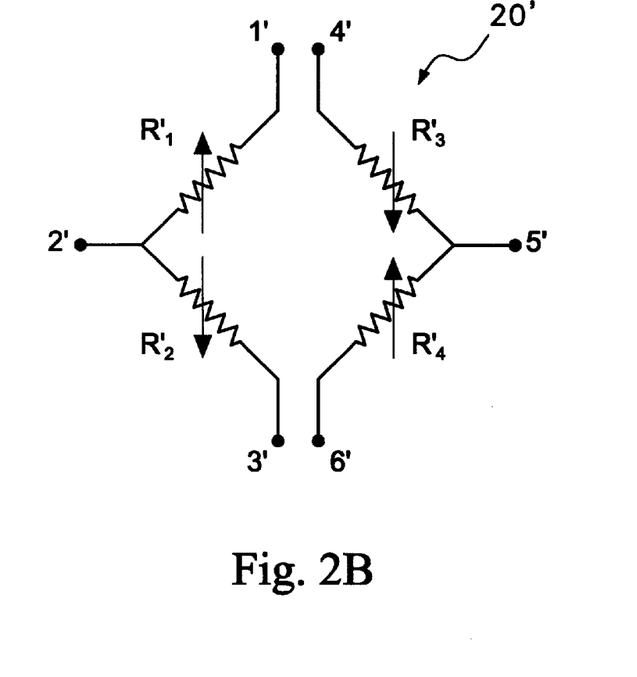

Surrounding each bridge 20, 20' and contact areas 1, 2, 3, 4, 5, 6 and 1', 2', 3', 4', 5', 6' is a rim 60 of P+silicon similarly formed as in the U.S. Pat. No. 5,286,671 patent, but physically separated from the bridge and contact areas. Within each contact area 11–16, 11'–16' is a corresponding small metallized area 1,2,3,4,5,6 and 1', 2', 3', 4', 5', 6'. The side of the silicon substrate remote and opposite from that bridges 20, 20' are formed on is suitably sculptured to form the two independent deflecting areas 30, 30'. Referring now also to FIGS. 2A and 2B, therein are illustrated electrical representations of the bridges 20, 20'.

Figure 3:
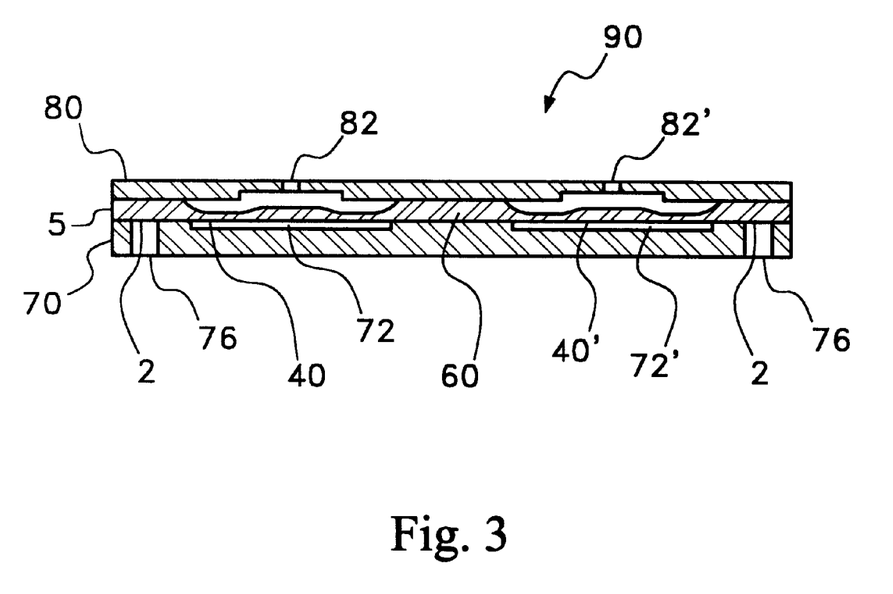
FIG. 3 illustrates a cross-section of a sensor chip assembly according to a preferred form of the present invention.
Figure 4:
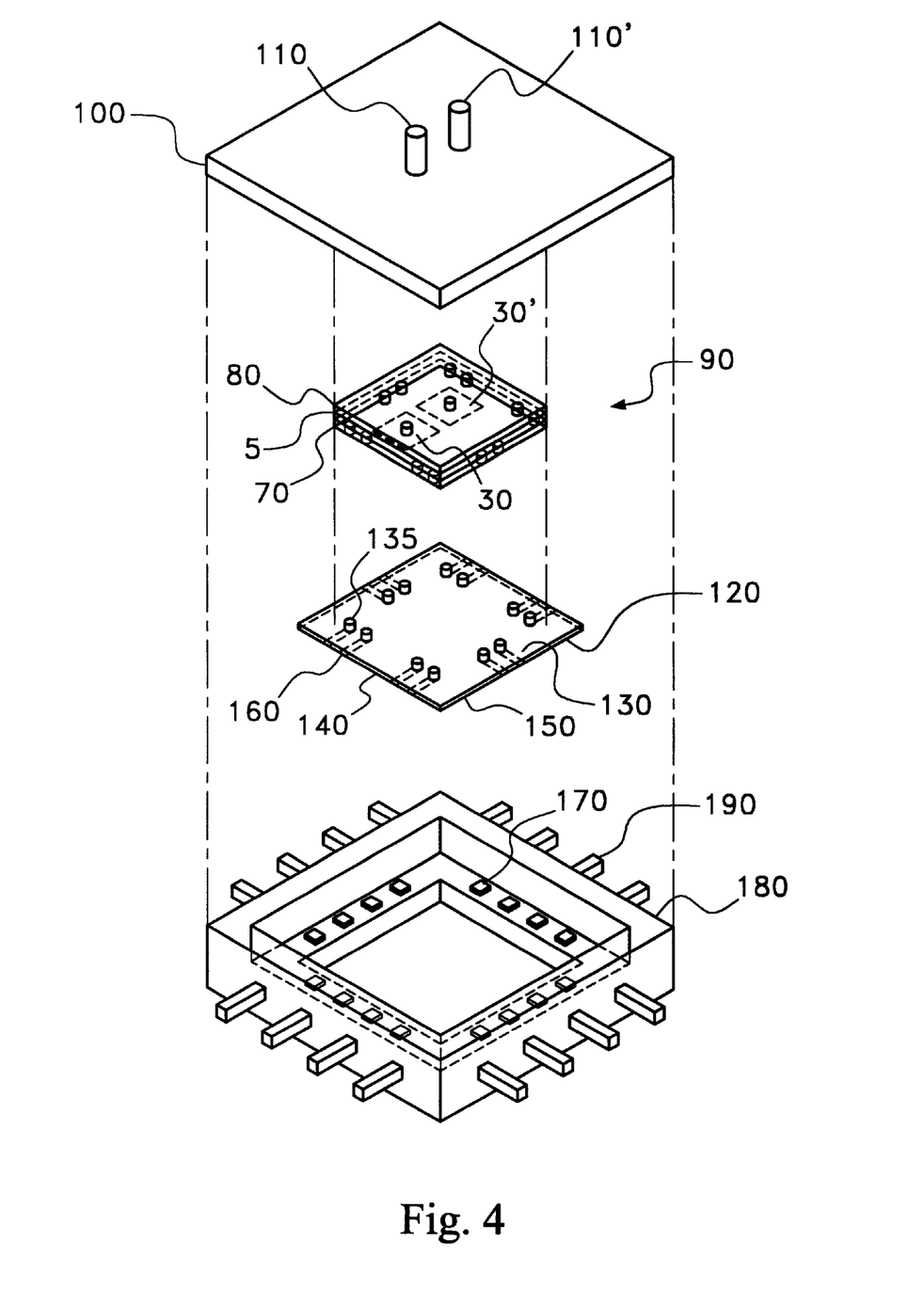
FIG. 4 illustrates an exploded-view assembly layout of the sensor chip assembly according to a preferred form of the present invention.

Referring now also to FIG. 3, a piece of Pyrex 70 containing two recesses 72, 72' congruent with the active regions 30, 30' of the two deflecting diaphragms 40, 40' and two groups of six apertures 76 congruent with the two sets of six metallized contacts 1, 2, 3, 4, 5, 6 and 1', 2', 3', 4', 5', 6' is sealed in a vacuum to the P+silicon fingers 11–16 and 11' –16' and rim 60. Thus, each active area 30, 30' is separated from the other by the presence of the two sets of surrounding rim 60. A second piece of Pyrex 80 preferably containing two apertures 82, 82', each of which separately accesses one of the active areas 30, 30' of the silicon wafer is sealed to the substrate. Thus, pressure from one aperture 82, 82' cannot access the other active area 30, 30'. The second piece of Pyrex 80 contains a layer of Titanium Platinum on the glass surface that is not sealed to the silicon wafers. The two sets of six apertures 76 in the first piece of Pyrex 70 are filled with a metal containing glass-frit and are subsequently fired leaving either a small protrusion or having a small protruding metallic sphere inserted therein. This is done in accordance with the teachings of U.S. Pat. No. 5,955,771 entitled *"SENSORS FOR USE IN HIGH VIBRATIONAL APPLICATIONS AND METHODS FOR FABRICATING SAME"*, the entire disclosure of which is also hereby incorporated by reference as if being set forth in its entirety herein. The resulting composite structure 90 is a Pyrex-silicon-Pyrex structure. Referring now also to FIG. 4, the composite Pyrex-silicon-Pyrex structure 90 is soldered or otherwise affixed to a metal plate 100 containing two through apertures 110, 110' congruent to the two apertures 82, 82' of the piece of Pyrex 80 containing the layer of Ti-Pt.

There is also fabricated a three layer structure 120 containing a first layer of Kapton 130, a layer of copper 140 and another layer of Kapton 150 or similar material. In the first layer of Kapton 130 there are apertures 135 congruent with protrusions extending through the first piece of Pyrex 70. The copper layer 140 is formed such that areas which contact the protrusions in the Pyrex glass 70, are led to a series of twelve contacts 160 arranged along the periphery of the Kapton-copper-Kapton structure 120. Still referring to FIG. 4, the Kapton-copper-Kapton structure 120 is affixed to the Pyrex-silicon-Pyrex structure 90, which was previously mounted to the metal plate 100 such that the protrusions on the Pyrex-silicon-Pyrex structure 90 contact the copper layer 140 through the openings 135 in the Kapton layer 130 and are soldered or otherwise electrically joined thereto. The metal plate 100 is preferably of a requisite size to serve as a cover for a flat lead-frame header and the twelve metal contacts 160, which are electrically exposed by apertures 135 in the first layer of Kapton 130, and are arranged to correspond to twelve of the various contact areas 170 within the flat-pack assembly 180. It should be noted that a properly metallized ceramic material could be used instead of the Kapton for higher temperature use.

Figure 5:
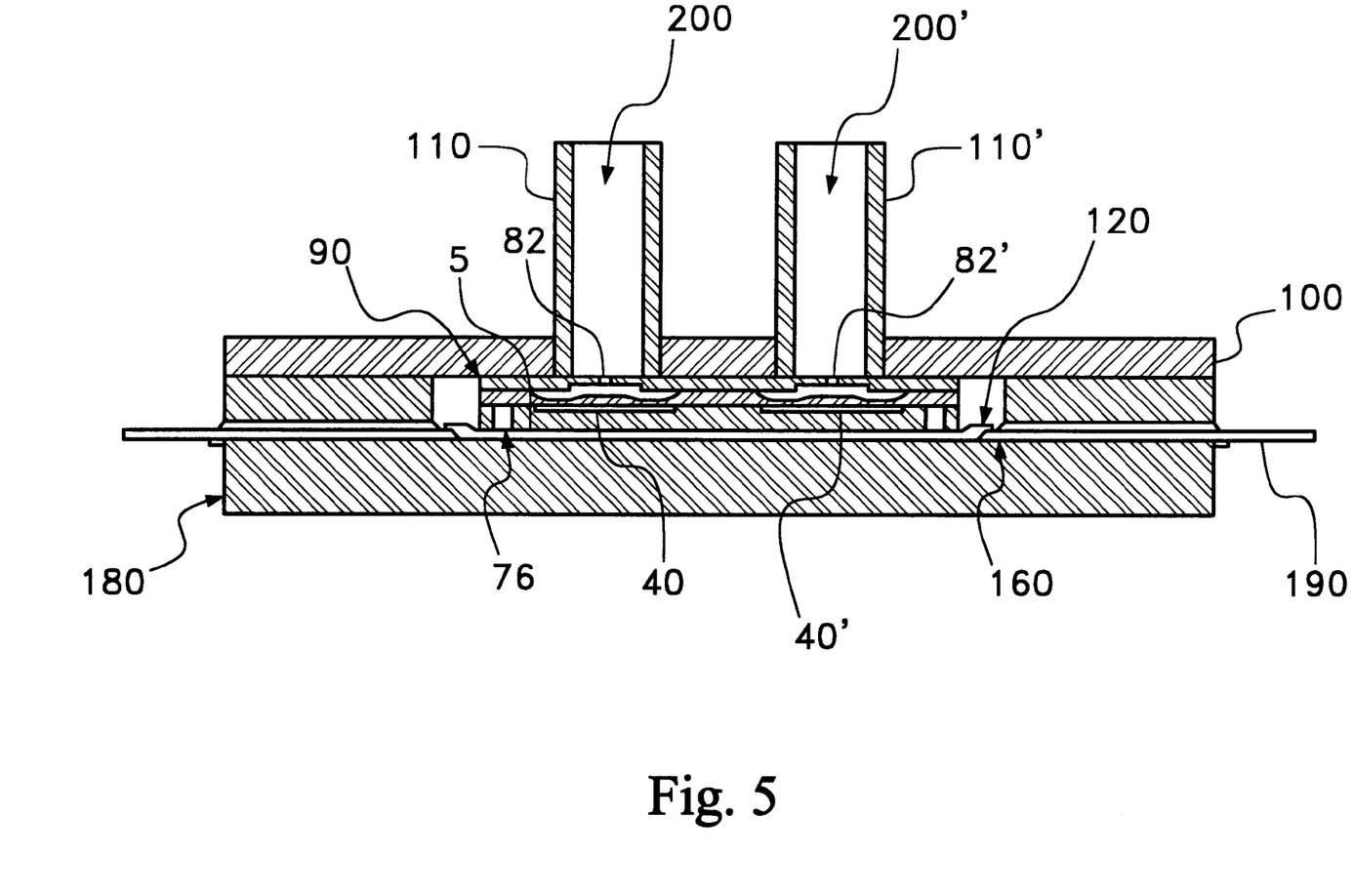
FIG. 5 illustrates a cross-section of the assembly of FIG. 3.
Figure 6:
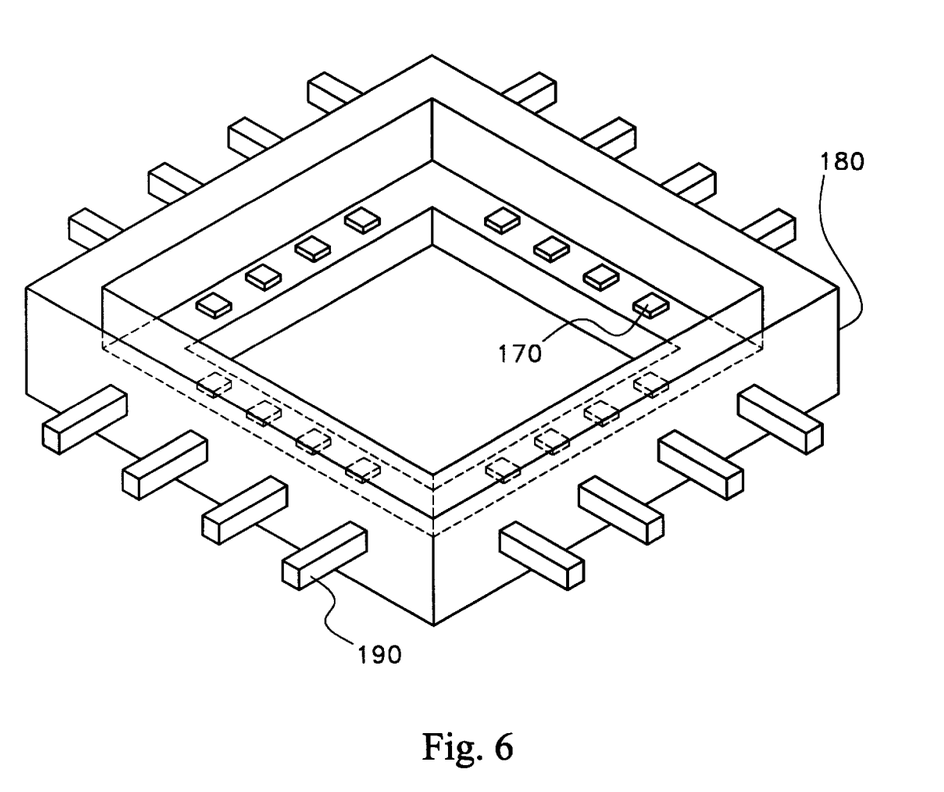
FIG. 6 illustrates an enlarged perspective view of the flat-pack case of FIG. 4.

The cover 100, sensor chip assembly 90 and the composite three-layer Kapton structure 120 are mounted to the flat-pack assembly 180 such that electrical contacts are made to appropriate contacts 170 in the flat-pack 180 using solder or another suitable conductive median. FIG. 6 illustrates an enlarged perspective view of the flat pack 180. The cover 100 is sealed to the flat assembly 180 using either epoxy or a similar material or else welded to the flat-pack assembly 180. As shown in FIG. 5, two different pressures 200, 200' may be applied to the sensor 10 through the apertures 110, 110' in the cover plate 100 which communicate through the apertures 82, 82' in the second glass piece 80 to the two separate bridges 20, 20' formed on the silicon wafer 5. Pressure from one aperture 82, 82' can only access one deflectable diaphragm 40, 40' of the silicon wafer 5 and not the other. Since each of the active areas 30, 30' are sealed separately to a vacuum reference cavity, then each active area can separately respond to the absolute pressure 200, 200' applied thereto.

Figure 7:
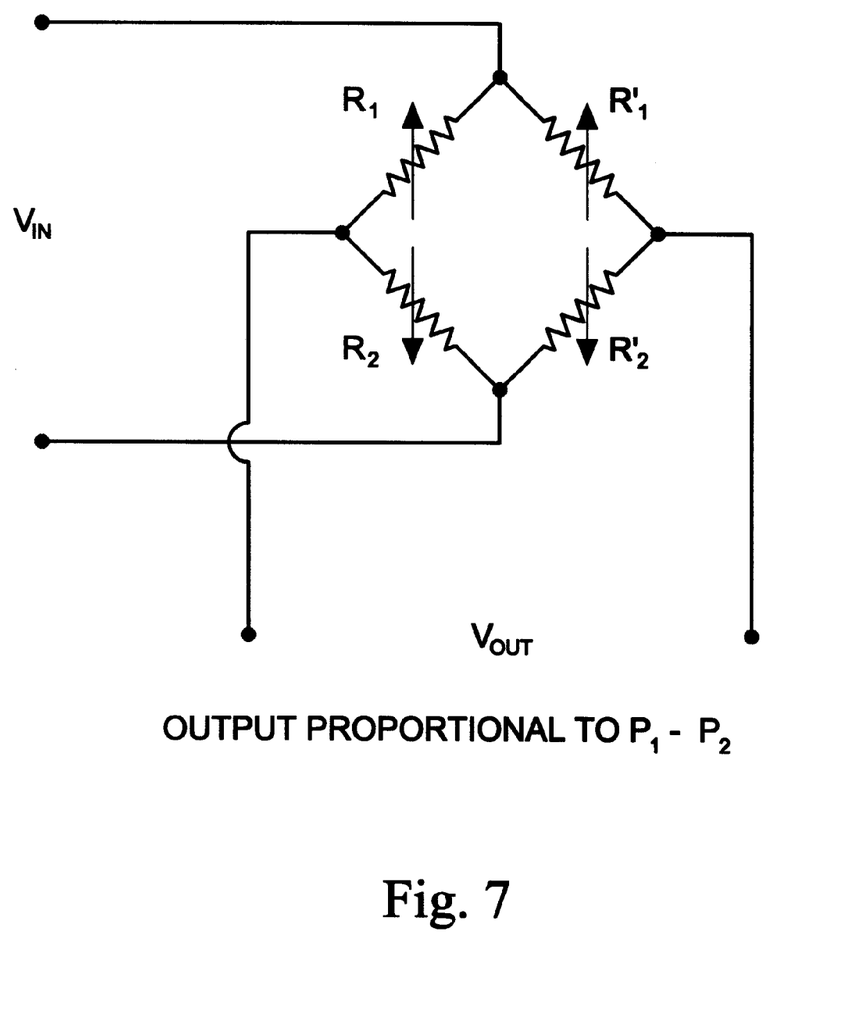
FIG. 7 illustrates a first circuit equivalence according to the preferred form of the invention.
Figure 8:
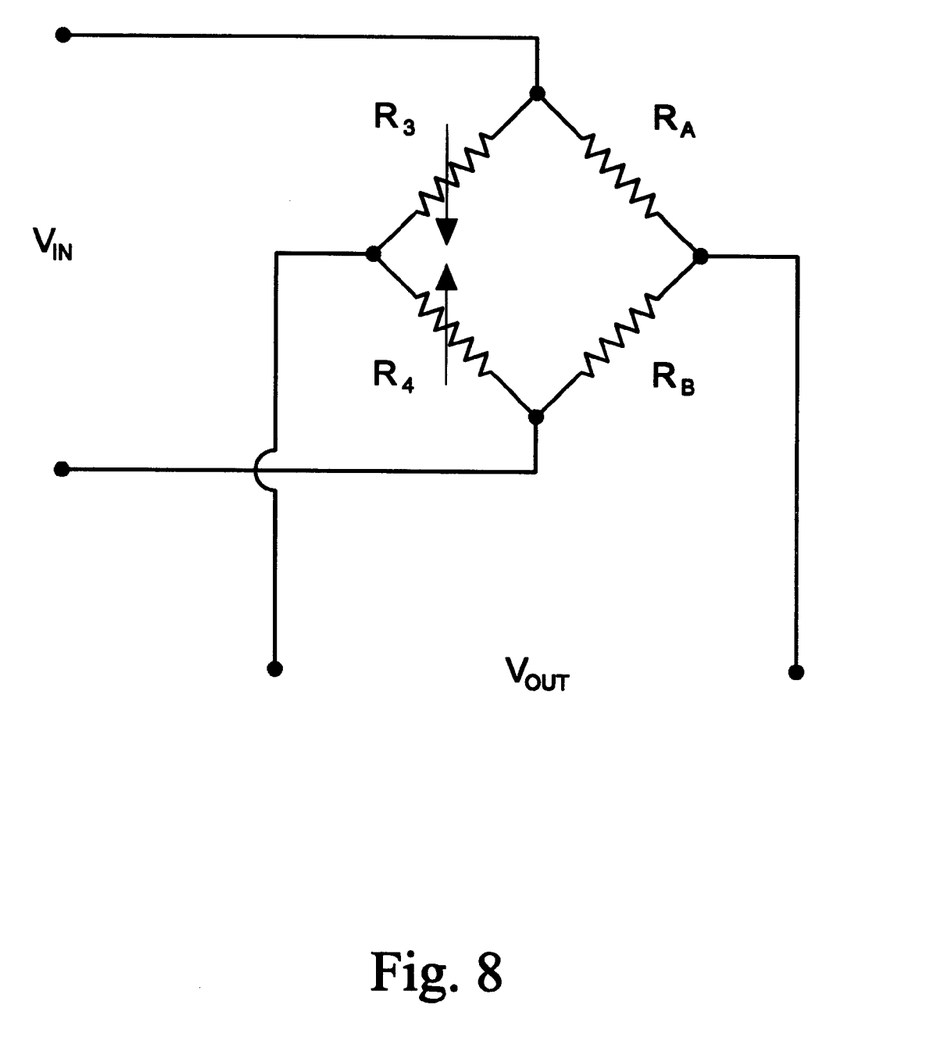
FIG. 8 illustrates a second circuit equivalence according to the preferred form of the invention.

It should be remembered that each active area 30, 30' had formed therein an open full bridge 20, 20' with six contact areas 11–16, 11' –16'. Referring now also to FIG. 7, if a half-bridge from the first active area 30 $(R_1, R_2)$ is connected to a half-bridge from the second active region 30' $(R_1', R_2')$ such that for positive pressure $(P_1, P_2)$ on both half-bridges 20, 20' the output from the two half-bridges tend to cancel, then the output of the resulting full-bridge will be proportional to a differential pressure $(P_1 - P_2)$. Referring now also to FIG. 8, if the second half-bridge from the second active area 30' is completed with two external resistors $R_A, R_B$, then the output from this bridge will be proportional to $P_1$. Thus, to measure $P_1 - P_2$, $R_1$ and $R_2$ are connected to $R_1'$ and $R_2'$ as shown in FIG. 7. To measure $P_1$, $R_3$ and $R_4$ are connected to $R_A$ and $R_B$ as shown in FIG. 8. Further, to measure $P_2, R_3'$ and $R_4'$ could be coupled to $R_A$ and $R_B$ analogously to the configuration of FIG. 8.

The resulting device has a number of unanticipated advantages. Because both bridges are side-by-side on the same silicon chip, they are subjected to essentially a same temperature, making thermal compensation much easier. This is particularly true of the differential pressure measurement since any thermal error between the two bridges will tend to cancel out. In addition, the device's small size, high temperature capability and leadless construction makes possible its utilization in numerous remote hostile environments.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

What is claimed is:

1. A dielectrically isolated single chip pressure sensor adapted to substantially simultaneously measure a first absolute pressure and a differential between said first pressure and a second absolute pressure comprising:

a semiconductor wafer including first and second recessed portions and at least one rim portion formed between said first and second recessed portions, said first and second recessed portions defining first and second deflectable diaphragms and said rim portion isolating said first deflectable diaphragm from said second deflectable diaphragm;

a first open four arm Wheatstone Bridge circuit mounted on said first deflectable diaphragm so as to be dielectrically isolated therefrom and responsive to said first pressure; and, a second open four arm Wheatstone Bridge circuit mounted on said second deflectable diaphragm so as to be dielectrically isolated therefrom and being responsive to said second pressure;

wherein, said first and second circuits are adapted to be electrically coupled to one another so as to cooperatively provide a common output indicative of a differential pressure associated with said first and second pressures while simultaneously partially providing an output indicative of said first or second pressures.

2. The transducer of claim 1, wherein said first circuit includes a first plurality of piezoresistors.

3. The transducer of claim 2, wherein said first plurality of piezoresistors are coupled in a first Wheatstone bridge configuration.

4. The transducer of claim 3, wherein said first Wheatstone bridge configuration includes first and second circuit portions, and each of said first and second circuit portions respectively includes two of said plurality of piezoresistors being coupled in series.

5. The transducer of claim 4, wherein said first circuit portion further includes a first input node electrically coupled to a first of said two piezoresistors, a second input node electrically coupled to a second of said two piezoresistors and a first output node electrically coupled between said first and second piezoresistors.

6. The transducer of claim 5, wherein said second circuit includes third and fourth piezoresistors coupled in series, a third input node electrically coupled to said third piezoresistor, a fourth input node electrically coupled to said fourth piezoresistor and a second output node electrically coupled between said third and fourth piezoresistors.

7. The transducer of claim 6, wherein said electrical coupling to provide a common output indicative of said differential pressure associated with said first and second pressures includes electrically coupling said first input node to said third input node and said second input node to said fourth input node, and measuring an output across said first and second output nodes.

8. The transducer of claim 1, further comprising a third circuit, wherein said second circuit is further adapted to be coupled to said third circuit to cooperatively therewith provide a second output indicative of said second pressure.

9. The transducer of claim 8, wherein said first circuit includes a first Wheatstone bridge structure including first and second circuit portions, said second circuit includes a second Wheatstone bridge structure including third and fourth circuit portions, and said first and third circuit portions are adapted to cooperatively provide said output indicative of said differential and said fourth circuit portion and third circuit are adapted to cooperatively provide said second output.

10. The transducer of claim 9, wherein said first circuit portion and since third circuits are further adapted to cooperatively provide a third output indicative of said first pressure.

11. The transducer of claim 10, wherein:

in a first mode, said transducer is adapted to provide said output indicative of said differential and said second output simultaneously; and, in a second mode, said transducer is adapted to provide said second and third outputs simultaneously.

12. A pressure sensing assembly comprising:

a wafer including first and second recessed portions respectively forming first and second deflectable diaphragms, at least one rim isolating said first diaphragm from said second diaphragm, and first and second circuits each respectively formed on an associated one of said first and second diaphragms, said first and second circuits each being dielectrically isolated from its respectively associated diaphragm and adapted to provide an output indicative of an amount of deflection of said associated diaphragm; and, a member including first and second ports respectively opening to a first aperture passing there through to said first diaphragm and a second aperture passing through to said second diaphragm, whereby when said first port is exposed to a first pressure to be measured said first diaphragm is exposed to a said first pressure through said first aperture, and when said second port is exposed to a second pressure to measured said second diaphragm is exposed to said second pressure through said second aperture;

wherein, said first and second circuits are adapted to be electrically coupled together to cooperatively provide a first output indicative of a differential between said first and second pressures to be measured, and said second circuit is further adapted to be simultaneously coupled to another circuit to cooperative therewith provide a second output indicative of said second pressure to be measured.

13. The assembly of claim 12, where in said other circuit comprises first and second resistors coupled in series.

14. The device of claim 13, wherein said first circuit comprises a first Wheatstone bridge stricture including a first plurality of piezoresistors.

15. The assembly of claim 14, wherein said second circuit comprises a second Wheatstone bridge circuit structure including a second plurality of piezoresistors.

16. The assembly of claim 15, wherein a first set of said first plurality of piezoresistors is electrically coupled to a first set of said second plurality of piezoresistors to cooperatively provide said first output.

17. The assembly of claim 16, wherein a second set of said second plurality of piezoresistors is electrically coupled with said third circuit to cooperatively therewith provide said second output substantially simultaneously with said first output.

18. The device of claim 12, further comprising a flatpack including a plurality of electrical contacts, wherein said first circuit includes at least a first input node and a first output node, said second circuit includes at least a second input node and a second output node, and each of said electrical contacts is respectively electrically coupled to a corresponding one of said input or output nodes.

19. The apparatus of claim 18, further comprising a connection layer interposed between said wafer and said flatpack, said connection layer including a conductive layer sandwiched between two other layers, wherein at least one of said other layers includes a plurality of apertures adapted to enable said conductive layer to be electrically coupled to said first and second circuits.

20. The apparatus of claim 19, wherein said connection layer further includes a plurality of pins extending around a periphery of said conductive layer for electrically coupling said conductive layer of said electrical contacts of said flatpack.

* * * * *